(12) United States Patent
Black et al.

(10) Patent No.: US 9,761,060 B2
(45) Date of Patent: *Sep. 12, 2017

(54) PARAMETERIZED MODEL OF 2D ARTICULATED HUMAN SHAPE

(71) Applicant: Brown University, Providence, RI (US)

(72) Inventors: Michael J. Black, Tuebingen (DE); Oren Freifeld, Menlo Park, CA (US); Alexander W. Weiss, Shirley, MA (US); Matthew M. Loper, Tuebingen (DE); Peng Guan, Mountain View, CA (US)

(73) Assignee: Brown University, Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,225

(22) Filed: Nov. 3, 2016

(65) Prior Publication Data

US 2017/0069102 A1     Mar. 9, 2017

Related U.S. Application Data

(63) Continuation of application No. 15/042,353, filed on Feb. 12, 2016, now Pat. No. 9,489,744, which is a
(Continued)

(51) Int. Cl.
*G06T 15/00* (2011.01)
*G06T 19/20* (2011.01)
(Continued)

(52) U.S. Cl.
CPC .......... *G06T 19/20* (2013.01); *G06K 9/00214* (2013.01); *G06K 9/00369* (2013.01);
(Continued)

(58) Field of Classification Search
None
See application file for complete search history.

(56) References Cited

U.S. PATENT DOCUMENTS

2005/0137015 A1    6/2005   Rogers et al.
2006/0098865 A1    5/2006   Yang et al.
(Continued)

OTHER PUBLICATIONS

Anguelov et al., "SCAPE: shape completion and animation of people", ACM Transactions on Graphics 2493): 408-416, 2005.
(Continued)

*Primary Examiner* — Xiao Wu
*Assistant Examiner* — Mohammad H Akhavannik
(74) *Attorney, Agent, or Firm* — Polsinelli PC

(57) ABSTRACT

Disclosed are computer-readable devices, systems and methods for generating a model of a clothed body. The method includes generating a model of an unclothed human body, the model capturing a shape or a pose of the unclothed human body, determining two-dimensional contours associated with the model, and computing deformations by aligning a contour of a clothed human body with a contour of the unclothed human body. Based on the two-dimensional contours and the deformations, the method includes generating a first two-dimensional model of the unclothed human body, the first two-dimensional model factoring the deformations of the unclothed human body into one or more of a shape variation component, a viewpoint change, and a pose variation and learning an eigen-clothing model using principal component analysis applied to the deformations, wherein the eigen-clothing model classifies different types of clothing, to yield a second two-dimensional model of a clothed human body.

17 Claims, 7 Drawing Sheets

Related U.S. Application Data continuation of application No. 13/696,676, filed as application No. PCT/US2011/039605 on Jun. 8, 2011, now Pat. No. 9,292,967.

(60) Provisional application No. 61/353,407, filed on Jun. 10, 2010.

(51) Int. Cl.

| | | |
|---|---|---|
| *G06T 17/00* | (2006.01) | |
| *G06T 17/20* | (2006.01) | |
| *G06K 9/00* | (2006.01) | |
| *G06K 9/48* | (2006.01) | |
| *G06T 7/13* | (2017.01) | |
| *G06T 7/149* | (2017.01) | |
| *G06T 7/00* | (2017.01) | |
| *G06T 15/20* | (2011.01) | |
| *G06K 9/62* | (2006.01) | |
| *G06T 3/40* | (2006.01) | |
| *G06T 3/60* | (2006.01) | |
| *G06T 11/60* | (2006.01) | |

(52) U.S. Cl.
CPC ............. *G06K 9/48* (2013.01); *G06K 9/6209* (2013.01); *G06T 7/0089* (2013.01); *G06T 7/13* (2017.01); *G06T 7/149* (2017.01); *G06T 15/20* (2013.01); *G06T 17/00* (2013.01); *G06T 17/20* (2013.01); *G06T 3/40* (2013.01); *G06T 3/60* (2013.01); *G06T 11/60* (2013.01); *G06T 2207/20081* (2013.01); *G06T 2207/30196* (2013.01); *G06T 2210/16* (2013.01)

(56) References Cited

U.S. PATENT DOCUMENTS

| | | |
|---|---|---|
| 2008/0180448 A1 | 7/2008 | Anguelov et al. |
| 2009/0116698 A1 | 5/2009 | Zhang et al. |
| 2009/0154796 A1 | 6/2009 | Gupta et al. |
| 2009/0284529 A1 | 11/2009 | De Aguiar et al. |
| 2010/0111370 A1 | 5/2010 | Black et al. |

OTHER PUBLICATIONS

PCT/US2011/039605 International Search Report dated Dec. 12, 2011.

Gregory Rogez et al., "A spatio-temporal 2D-models framework for human pose recovery in monocular sequences," ScienceDirect, Pattern Recognition 41, Sep. 1, 2008, 2926-2944.

Alexandru O. Balan et al., "The Naked Truth: Estimating Body Shape Under Clothing," Computer Vision ECCV 2008, Lecture Notes in Computer Science, Oct. 12, 2008, pp. 15-29.

Nils Hasler et al., "Reverse Engineering Garments," Computer Vision/Computer Graphics Collaboration Techniques, Lecture Notes in Computer Science, Mar. 28, 2007, pp. 200-211.

Greg Mori et al.., "Recovering Human Body Configurations: Combining Segmentation and Recognition," Proceedings of the 2004 IEEE Computer Society Conference and Computer Vision and Pattern Recognition, Jun. 27-Jul. 2, 2004, vol. 2, pp. 326-333.

Frank P. Ferrie et al., "Darboux Frames, Snakes and Super-Quadrics: Geometry from the Bottom Up," IEEE Transactions on Pattern Analysis and Machine Intelligence, vol. 15, No. 8, Aug. 1, 1993, pp. 771-784.

(a) (b) (c) (d)

(a) mean  (b)PC1  (c)PC2  (d)PC4  (e)PC1  (f)PC2  (g)PC8

(a) male  (b) compared to GT  (c) female  (d) compared to GT (a) (b) (c) (d) (e)

PARAMETERIZED MODEL OF 2D ARTICULATED HUMAN SHAPE

CROSS-REFERENCES TO RELATED APPLICATIONS

This application claims the benefit of and priority to U.S. patent application Ser. No. 15/042,353, filed on Feb. 12, 2016, which is a continuation of U.S. patent application Ser. No. 13/696,676, filed on Jun. 11, 2013, now U.S. Pat. No. 9,292,967, issued on Mar. 22, 2016, which is a national phase application of, and claims priority to, PCT/US2011/039605, filed on Jun. 8, 2011, which claims the benefit of prior filed U.S. provisional Application No. 61/353,407, filed Jun. 10, 2010, pursuant to 35 U.S.C. 119(e). The contents of which are incorporated herein by reference in their entirety.

STATEMENT REGARDING FEDERALLY SPONSORED RESEARCH OR DEVELOPMENT

This invention was made with support from Grant No. NIH EUREKA 1R01NS066311-01 from the National Institute of Health, and Grant No. NSF IIS-0812364 from the National Science Foundation. The United States Government has certain rights in the invention.

BACKGROUND OF THE INVENTION

The present invention relates to estimating human shape and pose from images where the shape and pose is in two dimensions. The present invention also relates to modeling clothing on 2D models of the human body, and more particularly to accurately estimate body shape underneath clothing and to recognize the type of clothing worn by a person.

The following discussion of related art is provided to assist the reader in understanding the advantages of the invention, and is not to be construed as an admission that this related art is prior art to this invention.

Three dimensional (3D) models of the human body have been widely reported and have become sophisticated and highly detailed, with the ability to accurately model human shapes and poses. Disadvantageously, however, they are complex and computationally intensive. Additionally, the estimation of such models from a single, monocular, image is ambiguous and may require sophisticated optical scanning methods for data acquisition.

Conversely, two-dimensional (2D) models of the human body are popular due to their representational and computational simplicity. Existing models include articulated pictorial structures models, active shape models (or point distribution models), parameterized non-rigid templates, and silhouette models. However, most 2D articulated person models have focused on estimating human pose and have ignored body shape.

It would therefore be desirable and advantageous to address this problem and to obviate other prior art shortcomings by developing models that explicitly represent human shape with contours and, furthermore, represent non-rigid human shape and pose. Such a representation enables addressing the issue of body shape recognition, a task that is beyond the scope of traditional 2D models. It would also be desirable and advantageous to explicitly model how clothing influences human shape based the 2D human shape model. It would also be desirable and advantageous to be able to predict 3D body shape from silhouettes in one or several 2D uncalibrated images.

SUMMARY OF THE INVENTION

Common models such as pictorial structures are typically fairly crude, lacking realistic detail which limits their expressive power within a generative framework. The 2D representation of a human body according to the present invention is based on a "contour person" (CP) model of the human body that has the expressive power of a detailed 3D model and the computational benefits of a simple 2D part-based model. The CP model is learned from a 3D model of the human body that captures natural shape and pose variations; the projected contours of this model, along with their segmentation into parts, form the training set. The CP model factors deformations of the body into three components: shape variation, viewpoint change and pose variation.

To model clothing, the CP model is "dressed" with a low-dimensional clothing model, to be referred to as "dressed contour person" (DCP) model. The clothing is represented as a deformation from the underlying CP representation. This deformation is learned from training examples using principal component analysis to produce eigen-clothing.

The 3D body shape is discriminatively predicted from parameters of the estimated 2D body using learned mapping (e.g. a mixture-of-experts model). For example, the method can be used to predict the 3D shape of a person from a cluttered video sequence. Alternatively, the 3D shape of a person can be estimated from several snapshots taken with a digital camera or cell phone.

One aspect of the present invention relates to a method for modeling two-dimensional (2D) contours of a human body by capturing natural shapes/poses of a three-dimensional (3D) model of a human body, projecting the 3D model into a camera plane to derive 2D contours, segmenting the 2D contours based on a predetermined segmentation of the 3D model, and creating a factored representation of non-rigid deformations of the 2D contours, wherein the deformations are represented by line segments.

According to one advantageous feature of the present invention, the deformations may be factored into at least two components selected from shape, pose and camera viewpoint. Edges of a contour proximate to a joint between segmented 2D contours may be corrected by applying non-rigid deformations to the edges of the contour proximate to the joint.

According to one advantageous feature of the present invention, a training set of clothing outlines and an underlying naked human body represented by the 2D contours may be created, and a displacement between contour points of the clothing outlines and the underlying naked human body may be determined to define a clothing deformation. The clothing deformation may represent a deformation (through scaling and rotation) of the line segments of 2D contours of the human body.

According to one advantageous feature of the present invention, the clothing deformation obtained from the training set may represent "eigen-clothing" which may be separated into "eigen-separates", with each "eigen-separate" covering a part of the 2D contours of the human body.

According to one advantageous feature of the present invention, different types of clothing may be classified based on clothing deformation coefficients.

According to one advantageous feature of the present invention, the "eigen-clothing" may be subtracted from a clothed human body, and the underlying naked human body may be estimated therefrom.

According to one advantageous feature of the present invention, the 3D model may be projected into different camera planes to derive 2D contours in at least two different views to obtain a plurality of body silhouettes, the 2D contour model may be fitted to the plurality of body silhouettes, 2D shape parameters may be determined from the factored representation of the non-rigid deformations of each of the plurality of body silhouettes, and 3D shape parameters may be predicted from the determined 2D shape parameters. The body silhouettes obtained for different shapes, poses and views of a person of the projected 3D model may be combined into an estimate of the 3D shape of the person.

According to one advantageous feature of the present invention, after subtracting "eigen-clothing" from the 2D contour model of a clothed human body to obtain the 2D contour model of an unclothed human body, 3D shape parameters of the unclothed human body may be predicted from the determined 2D shape parameters of the clothed human body.

According to another aspect of the invention, a two-dimensional (2D) contour person (CP) model for modeling an unclothed human body includes a shape variation component, a viewpoint change component, and a pose variation component, wherein the contour person (CP) model is learned from a 3D model of the human body that captures natural shape and pose variations, with projected contours of this model, along with their segmentation into parts, form a training set.

According to another aspect of the invention, a dressed contour person (DCP) model for modeling a clothed human body, includes the 2D CP model of an unclothed human body, wherein deformations are computed by aligning the contour of the clothed human body with the contour of the unclothed human body, and wherein an "eigen-clothing" model is learned using principal component analysis (PCA) applied to these deformations.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
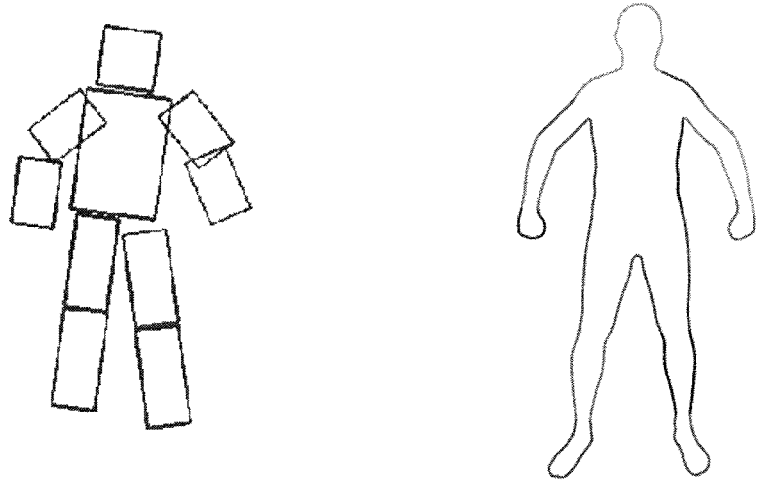
FIG. 1 shows a conventional 2D body models (left) in form of simple articulated collections of geometric primitives and a contour person (CP) model (right) according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The following abbreviation will be used throughout the specification:
CP Contour Person
DCP Dressed Contour Person
PCA Principal Component Analysis
ICP Iterative Closest Point
PS Pictorial Structures
SPM Scaled Prismatic Model
ASM Active Shape Model
PC Principal Component
NM Naïve method
NP3D Naked People Estimation in 3D
SCAPE Shape Completion and Animation of People
GT Ground truth The detection of people and the analysis of their pose in images or video have many applications and have drawn significant attention. In the case of uncalibrated monocular images and video, 2D models dominate while in calibrated or multi-camera settings, 3D models are popular. In recent years, 3D models of the human body have become sophisticated and highly detailed, with the ability to accurately model human shape and pose. In contrast, 2D models typically treat the body as a collection of polygonal regions that only crudely capture body shape (FIG. 1). Two-dimensional models are popular because they are relatively low dimensional, do not require camera calibration, and admit computationally attractive inference methods. For many problems, such as pedestrian detection, full 3D interpretation may not be needed.

In this invention, a novel 2D model of the body is described that has many of the benefits of the more sophisticated 3D models while retaining the computational advantages of 2D. This 2D Contour Person (CP) model (FIG. 1) provides a detailed 2D representation of natural body shape and captures variations across a population. However, the CP retains the part-based representation of current 2D models as illustrated in FIG. 1. An articulated part-based model is advantageous for pose estimation using inference methods such as belief propagation. Importantly, the CP model also captures the non-rigid deformation of the body that occurs with articulation. This allows the contour model to accurately represent a wide range of human shapes and poses. Like other 2D body models, the approach is inherently view-based with 2D models constructed for a range of viewing directions (e.g., frontal view, side view).

The CP model builds on a person detector that uses a conventional pictorial structure (PS) model. However, the CP model according to the invention increases the realism by modeling shape variation across bodies as well as non-rigid deformation due to articulated pose changes. Moreover, it provides several types of pose parameterizations based on the PS model, thus making use of existing PS inference algorithms. Importantly, the CP model according to the invention models deformations of 2D contours which is important for explicitly modeling articulation and for factoring different types of deformations.

Figure 2:
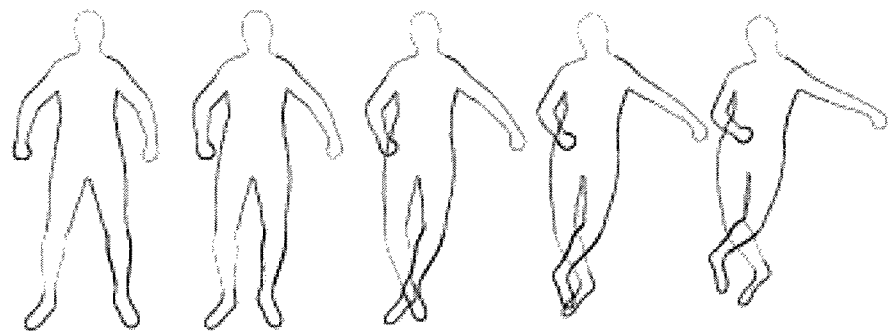
FIG. 2 shows the CP model with a range of articulation of different body parts.

Referring now to FIG. 2, the 2D body shape is factored into: 1) a linear model characterizing shape change across the population; 2) a linear approximation to distortions caused by local camera view changes; 3) an articulation of the body parts represented by a rotation and length scaling; and 4) a non-rigid deformation associated with the articulation of the parts. An example of the full model with a range of articulations of different body parts is shown in FIG. 2.

The CP model is built from training data generated from a 3D SCAPE (Shape Completion and Animation of PEople) body model capturing realistic body shape variation and non-rigid pose variation. Each training body for the CP model is generated by randomly sampling a body shape, in a random pose and viewed from a random camera. The bounding contour of the 3D body is projected onto the camera plane to produce a training contour. The known segmentation of the 3D model into parts induces a similar 2D contour segmentation (FIG. 2).

As described in more detail in Provisional U.S. Patent Application Ser. No. 61/353,407, the contents of which are incorporated by reference in their entirety as if fully set forth herein, the CP is a pattern-deformable template model whose basic deformation unit is a scaled rotation matrix acting on a line segment connecting two contour points.

$$01] \; T = \tilde{x}_1 \, \tilde{y}_1 \, \tilde{x}_2 \, \tilde{y}_2 \ldots x_N \quad (1)$$

and $$C = (x_1 \, y_1 \, x_2 \, y_2 \ldots x_N \, y_N)^T \quad (2)$$

represent a template and a deformed contour respectively, where N is the number of contour points. For now, assume for simplicity that the contour is closed and linear. In effect, every contour point is connected exactly to two points: its predecessor and successor in a (for example) clockwise orientation. This graph connectivity is expressed by a 2N by 2N sparse matrix E:

$$E = \begin{pmatrix} -1 & 0 & 1 & 0 & \ldots & 0 & 0 & 0 & 0 \\ 0 & -1 & 0 & 1 & \ldots & 0 & 0 & 0 & 0 \\ 0 & 0 & -1 & 0 & \ldots & 0 & 0 & 0 & 0 \\ & & & & \vdots & & & & \\ 0 & 0 & 0 & 0 & & -1 & 0 & 1 & 0 \\ 0 & 0 & 0 & 0 & & 0 & -1 & 0 & 1 \\ 1 & 0 & 0 & 0 & \ldots & 0 & 0 & -1 & 0 \\ 0 & 1 & 0 & 0 & \ldots & 0 & 0 & 0 & -1 \end{pmatrix}. \quad (3)$$

The CP deformation is encoded in D (D is parameterized by $\Theta$, to be described later), a block diagonal matrix, whose 2 by 2 blocks are scaled rotation matrices. In effect, let $(S_i, \theta_i)$ denote the scale and angle of the $i^{th}$ directed line segment between two points in T and let $D_{2\times 2}^i$ represent the associated scaled rotation matrix acting on this line segment:

$$D_{2\times 2}^i = S^i \begin{pmatrix} \cos\theta_i & -\cos\theta_i \\ \sin\theta_i & \sin\theta_i \end{pmatrix} = \exp\left( s^i \begin{pmatrix} 1 & 0 \\ 0 & 1 \end{pmatrix} + \theta^i \begin{pmatrix} 0 & -1 \\ 1 & 0 \end{pmatrix} \right) \quad (4)$$

where $s^i = \log S^i$ is the log of the scale, and exp stands for the matrix exponential. Thus, the matrix product $$EC = DET \quad (5)$$

defines the directed line segments of C as a deformed version of those of T. Note that left multiplication of ET by D can be viewed as an action of a Lie group.

However, for an arbitrary $D = D(\Theta)$ this matrix product may not result in a meaningful contour (e.g., not closed). A possible solution is imposing a global constraint on the local deformations, with the disadvantage of losing the group structure of the deformations. Instead, a different approach is employed. Specifically, given a prescribed deformation matrix D, we seek a contour C such that its line segments (denoted by $e_i$) are close to the desired deformed line segments of T (denoted by $D_{2\times 2}^i l_i$) in a least squares sense. In effect, we seek to minimize $$\sum_{i=1}^{N} \|D_{2\times 2}^i l_i - e_i\|^2 = \|DET - EC\|^2. \quad (6)$$

The minimizer yields the contour synthesis equation:

$$C = E^\dagger DET \; C \quad (7)$$

where $E^\dagger$, the Moore-Penrose pseudoinverse of the constant matrix E, is computed offline. The connectivity of G ensures the closure of C.

Eq. 7 shows how to synthesize C from D and the template. Conversely, given known $l_i$ and $e_i$, we compute $D_{2\times 2}^i$, by solving the invertible $\|l_i\| > 0$ linear system $$e_i = s_i R_{\theta_i} l_i = \begin{pmatrix} l_i^{(1)} & -l_i^{(2)} \\ l_i^{(2)} & l_i^{(1)} \end{pmatrix} \begin{pmatrix} s_i \cos\theta_i \\ s_i \sin\theta_i \end{pmatrix}. \quad (8)$$

Deformations of the template contour are factored into several constituent parts: pose, shape, and camera, which are then composed to derive the full model.

Starting from the 3D SCAPE model, numerous realistic body shapes are generated in a canonical pose and their contours are projected into the image. The segmentation of contour points in 2D is known from the segmentation of the body parts in 3D, which is used to evenly space points along a training part. The known segmentation prevents points from "sliding" between parts. The result is 2D training contours with known alignment of the contour points.

The deformation for each contour is computed from a single template contour. A matrix of all these training deformations is then formed (subtracting the mean) and PCA (Principal Component Analysis) is performed, resulting in a linear approximation to contour deformations caused by body shape variation parameterized by the PCA coefficients.

Global deformations, which are used in linear pose parametrization, can be accommodated like any other deformation in the PCA analysis, for example, by adding a sparse row to E, with ½ and −½ at suitable places in the matrix.

The deformations due to camera variation are also well captured by PCA, with 6 components accounting for more than 90% of the variance.

In the 3D SCAPE model, deformations due to body articulation are modeled by a two-step process. First, a rigid rotation is applied to the entire limb or body part, and then local non-rigid deformations are applied according to a learned linear model. A similar approach is employed here in 2D.

Figure 3:
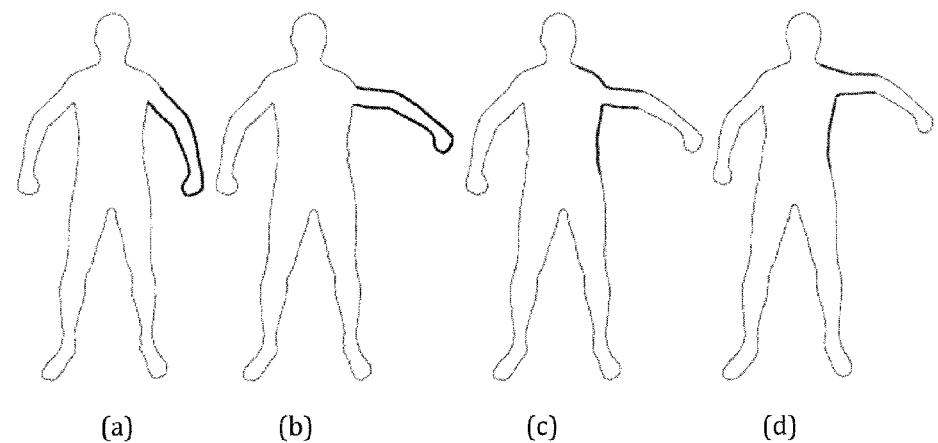
FIG. 3 illustrates a non-rigid deformation of the left arm (heavy line) of the contour person, showing (a) template; (b) rigid transformation of upper arm; (c) same as (b) but with parts which should be non-rigidly deformed due to the rigid motion marked in heavy lines; and (d) final deformed contour with the non-rigidly deformed parts marked in heavy lines.

Turning now to FIG. 3, as seen for example in (b), a rigid motion of the upper arm does not account for non-rigid deformations of the shoulder. This is corrected by applying a learned non-rigid deformation to the edges of the contour in the vicinity of the joint (d). Note that a rigid motion of the upper arm affects the non-rigid deformation of the upper arm as well as those of the lower arm and the shoulder. The residual is the deformation of the contour that is not accounted for by part-rotation and part-scaling.

The CP model according to the invention utilizes 3D information when it is constructed; this is quite different from standard 2D models and allows it to handle self-occlusions as well as out of the plane rotations. In a standard 2D contour model, the ordering of the points would be poorly defined. However, since the contours of the CP model according to the invention are generated from a 3D mesh, the correspondence between 2D contour points and the respective points and body parts on the 3D mesh is known, so that the contour is correctly connected even in the event of a crossover in 2D.

Figure 4:
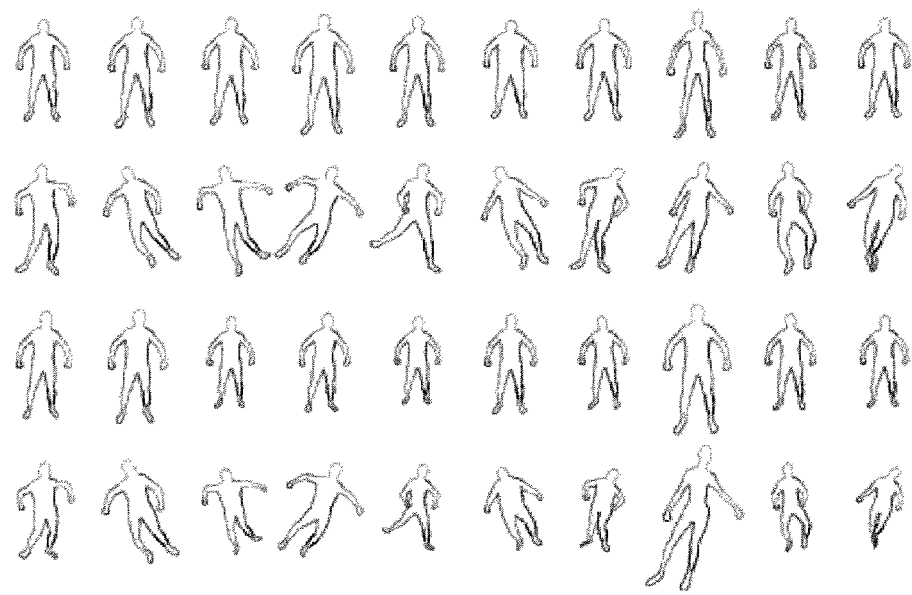
FIG. 4 shows 2D contour people sampled from the model: Row 1: variations in body shape; Row 2: variations in pose; Row 3: variations in camera view; and Row 4: a combination of all variations.

The full model is derived by first training each deformation model independently and then composing them by way of a simple matrix multiplication. Since 2D rotation matrices commute, the composition order is immaterial. Given parameters for shape, pose, and camera view, the overall deformation is given by the deformation synthesis equation:

$$D(\Theta) = D_{pose} D_{shape} D_{camera} \quad (9)$$

where $\Theta = \{\Theta^{pose}, \Theta_{shape}, \Theta_{camera}\}$. $D(\Theta)$ can be substituted into the contour synthesis equation $C = E^\dagger DET$ to produce a new contour C. In the example illustrated in FIG. 4, 24 pose parameters (12 joints×2), 10 shape coefficients and 6 camera coefficients are used, for a total of 40 parameters.

An exemplary application of the CP model is related to the problem of segmenting images of humans. The CP model provides a strong prior over human body shape that can be used to constrain more general segmentation algorithms. Specifically, one searches over the CP parameters that optimally segment the image into two regions (person and non-person) using a cost function that 1) compares image statistics inside the contour with those outside; 2) favors contours that align with image edges; and 3) enforces our prior model over shape, pose and camera parameters. A region term of the segmentation objective compares intensity and color histograms inside and outside the body contour. Because the segmented contour should also follow image edges, image edges are detected using a standard edge detector and a thresholded distance transform is applied to define an edge cost map normalized to [0, 1].

The model is not clothed and consequently will produce segmentations that tend to ignore clothing. While the optimization could be made explicitly robust to clothing, it might be advantageous for segmenting clothed people to explicitly model clothing which will be described in detail below.

Figure 5:
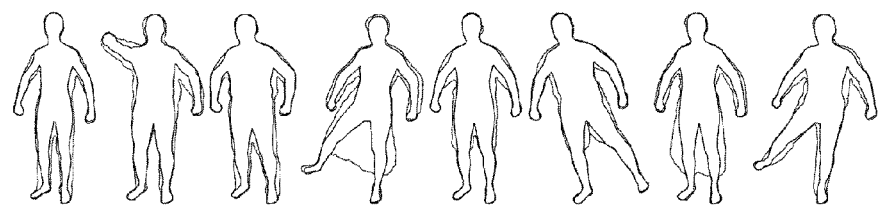
FIG. 5 shows the dressed contour model of the invention in different body shapes and poses, dressed in different types of eigen-clothing.

Conventional 2D models which are widely used in computer vision tasks, such as pose estimation, segmentation, pedestrian detection and tracking, fail to explicitly model how clothing influences human shape. In the following, an exemplary embodiment of a fully generative 2D model is described that decomposes human body shape into two components: 1) the shape of the underlying naked body and 2) the shape of clothing relative to the underlying body. The naked body shape is represented by the Contour Person (CP) model as described in the previous section. Given training examples of people in clothing with known 2D body shape, we compute how clothing deviates from the naked body to learn a low-dimensional model of this deformation. The resulting generative model will be referred to hereinafter as the Dressed Contour Person (DCP), with examples from this model shown in FIG. 5.

The key idea is to separate the modeling of the underlying body from its clothed appearance. The most likely naked body shape can be inferred from images of clothed people by explicitly modeling clothing. The model also supports new applications such as the recognition of different types of clothing.

There are several novel properties of the DCP model. First, so-called eigen-clothing is defined to model deformation from an underlying 2D body contour. Given training samples of clothed body contours, where the naked shape of the person is known, the naked contour is then aligned with the clothing contour to compute the deformation. The eigen-clothing model is learned using principal component analysis (PCA) applied to these deformations. A given CP model is then "clothed" by defining a set of linear coefficients that produce a deformation from the naked contour. This is illustrated, for example, in FIG. 5.

The estimation of a person's 2D body shape under clothing from a single image is demonstrated, showing clearly the advantages over a principled statistical model of clothing.

Finally the problem of clothing category recognition is introduced. It can be shown that the eigen coefficients of clothing deformations are distinctive and can be used to recognize different categories of clothing such as long pants, skirts, short pants, sleeveless tops, etc. Clothing category recognition could be useful for person identification, image search and various retail clothing applications.

In summary, the key contributions of this invention include: 1) the first model of 2D eigen-clothing; 2) a full generative 2D model of dressed body shape that is based on an underlying naked model with clothing deformation; 3) the inference of 2D body shape under clothing that uses an explicit model of clothing; and 4) a shape-based recognition of clothing categories on dressed humans.

We directly model the deformation from a naked body to a clothed body by virtually "dressing" the naked contour with clothing. We start with a training set (described below) of clothing outlines and corresponding naked body outlines underneath. The CP model is first fit to the naked body outline to obtain a CP representation with a fixed number of contour points. For each point on the CP, we find the corresponding point on the clothing outline and learn a point displacement model using PCA. We further learn a prior over the PCA coefficients using a Beta distribution to prevent infeasible deformations (i.e. "negative clothing" that causes the naked body to appear smaller than it is). Finally we define a two layer deformation model in which the first layer generates a naked body deformation from a template body and the second layer deforms the naked body to a clothed body. The parameters controlling the pose and shape of the body can be changed independently of the parameters controlling clothing type. These method requires training contours of people in clothing for which we know the true underlying naked body shape. We use two such training sets.

Synthetic data provides GT (Ground Truth) body shapes that enable accurate quantitative evaluation. We use 3D body meshes generated from the CAESAR database (SAE International) of laser range scans and then dress these bodies in simulated clothing. We use 60 male and 100 female bodies spanning a variety of heights and weights and use commercial software (OptiTex International, Israel) to generate realistic virtual clothing. The clothing simulation produces a secondary 3D mesh that lies outside the underlying body mesh by construction. Given a particular camera view, we project the body mesh into the image to extract the body outline and then do the same for the combined body and clothing meshes. This provides a pair of training outlines. We restrict the clothing to a single type (Army Physical Training Uniforms) but in sizes appropriate to the body model. While narrow, this dataset provides perfect training data and perfect ground truth for evaluation.

For training data of real people in real clothing we used a dataset with a set of images of 6 subjects (3 male and 3 female) captured by 4 cameras in two conditions: 1) A "naked condition" where the subjects wore tight fitting clothing; 2) A "clothed condition" in which they wore various different "street" clothing. Each subject was captured in each condition in a fixed set of 11 postures. Each posture was performed with 6-10 different sets of clothing (trials) provided by the subjects. Overall there are 47 trials with a total of 235 unique combinations of people, clothing and pose. For each clothed image we used standard background subtraction to estimate the clothed body silhouette and extracted the outline. To obtain the underlying naked body outlines of those clothed images, we obtained the 3D parametric body model fit using the 4 camera views of the naked condition. We consider the resulting 3D body shape to be the true body shape. For each subject in each posture the pose of the 3D body has been optimized using the 4 camera views while holding the shape fixed. The resulting 3D body outline is then projected into a certain camera view and paired with the segmented clothed body in that view. Note that the fitting of the 3D body to the image data is not perfect and, in some cases, the body contour actually lies outside the clothing contour. This does not cause significant problems and this dataset provides a level of realism and variability not found in the perfect synthetic dataset.

Given the naked and clothed outlines, we need to know the correspondence between them. Defining correspondence is nontrivial and how it is done is important. Incorrect correspondence (i.e. sliding of points along the contour) results in eigen shapes that are not representative of the true deformations of the contours.

Figure 6:
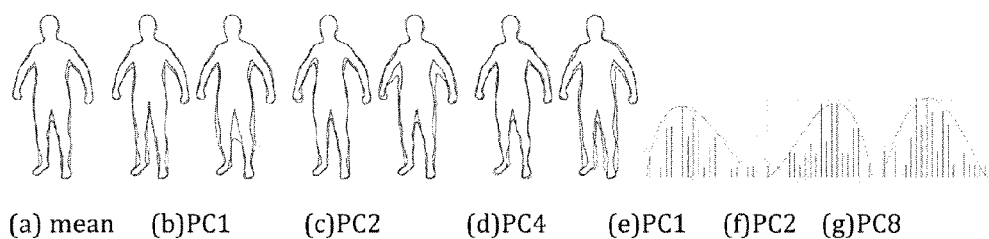
FIG. 6 shows for the same naked shape the mean clothing contour (a) and the clothing contour ±3 std from the mean for several principal components (b)-(d). The associated statistics of the clothing deformations are shown in (e)-(g)

Two contours $B_T(\psi)$ for the CP and G for the clothing contour, both of which have N points, are computed. For each body/clothing pair, x and y, coordinates of the body and clothing contours are stacked to get $u=(b_{x_1}, b_{x_2}, b_{y_1}, b_{y_2}, \ldots b_{x_N}, b_{y_N})^T$ for the body and $v=(c_{x_1}, c_{x_2}, c_{y_1}, c_{y_2}, \ldots c_{x_N}, c_{y_N})^T$ for the clothing. The clothing deformation is then defined by $\delta=u-v$ on which PCA is performed. It can be shown that the first 8 principal components account for around 90% of the variance to define the eigen-clothing model. FIG. 6 shows the mean clothing base and the first few clothing bases. This illustrates how the bases can account for things like long pants, skirts, baggy shirts, etc. The statistics of clothing deformations are shown in FIG. 6, including exemplary histograms and Beta distribution fits to linear eigen-clothing coefficients. Note the skew that results from the fact that clothing generally makes the body to appear larger.

With this model, new body shapes in new types of clothing can be generated by first sampling CP parameters $\psi$ to create a naked body contour $B_T(\psi)$ and generating a clothed body using $C(B_T(\psi),\eta)=B_T(\psi)+C_{mean}+\Sigma_{i=1}^{N_\eta}\eta_i \cdot C_i$, where $N_\eta$ is the number of eigen vectors used, the $\eta_i$'s are coefficients, $C_{mean}$ is the mean clothing deformation, and $C_i$ is the $i^{th}$ eigen-clothing vector.

Based on the observation of natural clothing statistics, a prior on the clothing deformation coefficients can be learned to penalize infeasible clothing deformations. The clothing contour $C(B_T(\psi),\eta)$ is the result of two layer deformations, with the first one, $B_T(\psi)$, from a body template to a particular body and the second one, $C(B_T(\psi),\eta)$, from the body to a clothing contour. The inference problem is to estimate variables $\psi$ and $\eta$ with a single clothing view. A likelihood function is defined in terms of silhouette overlap. The final energy function $E(\psi,\eta)=E_{data}(\psi,\eta)+\lambda E_{prior}(\eta)$ is minimized, wherein $\lambda$ indicates the importance of the prior. Problems with "negative clothing" and clothing that is unusually large are avoided due to the prior. Optimization is performed using MATLAB's fminsearch function, although other optimization methods may be used, such as gradient descent or stochastic search.

Two novel applications of the proposed method will now be described. One is to estimate the underlying 2D body given a clothing observation. The other is clothing category recognition by classifying the estimated clothing deformation parameters. The model will be examined for: (1) naked body estimation for synthetic data, (2) naked body estimation for real data, and (3) clothing type classification for real data. The results of the first two tasks will be compared with approaches that do not explicitly model clothing deformation.

Figure 7:
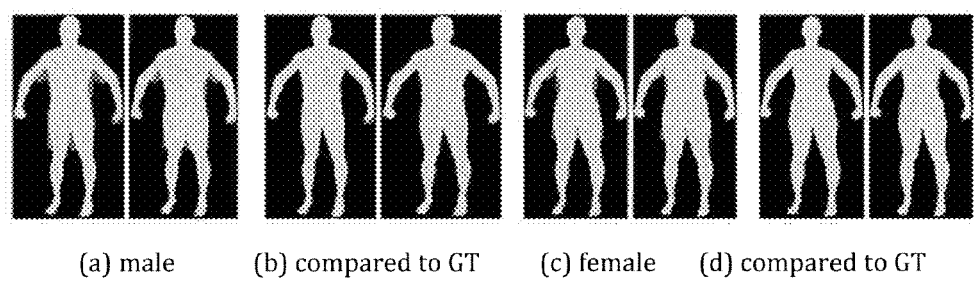
FIG. 7 shows synthetic data results, with each pair (a)-(d) showing the DCP result is on the left and NM (naïve method) result is on the right.

The results of DCP are also compared for synthetic data with a naive method (NM) in which the CP model is simply fitted to the clothing observation. The NM takes clothing into account by assessing a greater penalty if the estimated silhouette falls outside of the clothing observation and less if it does not fully explain the clothing observation. The average estimation errors obtained with NM for males and females are 4.56% and 4.72% respectively while DCP achieves 3.16% and 3.08%. The DCP model thus improves the relative accuracies over NM by 30% (for male) and 35% (for female). While the synthetic dataset has only one clothing type, the bodies span a wide range of shapes. The results show the advantage of modeling clothing deformation compared with ignoring clothing. FIG. 7 shows some representative results from the test set, with the DCP result on the left and NM result on the right. The first pair shows an estimated body silhouette overlaid on clothing silhouette; overlapped regions are shown with light texture. The second pair shows the estimated body overlaid on the ground truth (GT) body. While the first and second pairs are for a male, the third and fourth pairs show body silhouettes for a female. NM typically overestimates the underlying body while still keeping the body inside the clothing silhouette.

In a body estimation under clothing for real data, eight different poses (arranged in each row of FIG. 8) are evaluated, each pose with 47 instances having unique combinations of subject and clothing. Since the number of body/clothing pairs is limited, in each pose, a leave-one-out strategy is used where the body of instance i is estimated using the eigen-clothing space learned from all the other 46 instances, excluding i. The underlying naked body DCP is estimated for a total of 47*8=376 instances (FIG. 8) and the results are compared with two other methods: 1) NM described in the previous experiment; and 2) "Naked People estimation in 3D"(NP3D). Since DCP and NM are 2D methods using a 2D CP model, they only use one camera view. NP3D, however, uses a 3D model with multiple views and the 3D body was computed with all 4 camera views. To compare with NP3D the estimated body is projected from NP3D into the image using the camera view used by the method of the invention. Table 1 shows the comparison of Average Estimation Error (AEE) and standard deviation (std) on 47 instances for each pose. By modeling clothing deformations the 2D method of the invention even outperforms the conventional multi-camera method.

While clothing deformation models have been shown for static poses, it should be understood that this model can be applied to a range of poses. In particular, given training data of the CP model in different poses and the associated clothing deformation for each pose, the model can be extended to learn a deformation as a function of the pose. This function can be represented by a linear, multi-linear, or non-linear model. Given the body in a particular pose, the appropriate clothing deformation can then be synthesized based on the pose.

Here we have described clothing deformation as a point deformation from the underlying CP model. The CP model itself is defined in terms of edges. It should be understood that the clothing model can also adopt this representation. In this case clothing becomes a deformation (scale and rotation) of line segments from the underlying CP model.

Although all the clothing on the body was modeled at once, it should be clear that different pieces of clothing can be modeled individually. These models will be referred to as "eigen-separates", with separate eigen models for tops and bottoms for example, as described with reference to FIG. 9. A body is then clothed by combining the separate deformation from each piece of clothing to produce a dressed body. This same idea can be used to model hair, hat and shoe deformations. In fact it can also model things like backpacks, purses or other items worn or carried by humans.

The estimation of 2D body shape under clothing has numerous potential applications, especially when multiple cameras are not available. Consider forensic video from a single camera in which the anthropometric measurements of the suspect are to be identified while the body's shape is

TABLE 1

Comparison on real data: DCP, NM, and NP3D methods

|  | Pose 1 | Pose 2 | Pose 3 | Pose 4 | Pose 5 | Pose 6 | Pose 7 | Pose 8 | Average |
|---|---|---|---|---|---|---|---|---|---|
| DCP (AEE) | 3.72% | 5.25% | 5.08% | 4.37% | 4.33% | 4.51% | 5.03% | 6.68% | 4.87% |
| DCP (std) | 0.019 | 0.028 | 0.029 | 0.031 | 0.022 | 0.028 | 0.026 | 0.038 | 0.022 |
| NP3D (AEE) | 4.11% | 6.28% | 5.62% | 4.84% | 4.94% | 4.60% | 4.72% | 7.23% | 5.29% |
| NP3D (std) | 0.027 | 0.032 | 0.034 | 0.028 | 0.036 | 0.026 | 0.036 | 0.051 | 0.023 |
| NM (AEE) | 8.56% | 9.12% | 8.46% | 8.35% | 8.77% | 9.21% | 9.02% | 11.84% | 9.18% |
| NM (std) | 0.023 | 0.026 | 0.031 | 0.029 | 0.028 | 0.035 | 0.031 | 0.043 | 0.025 |

Figure 9:
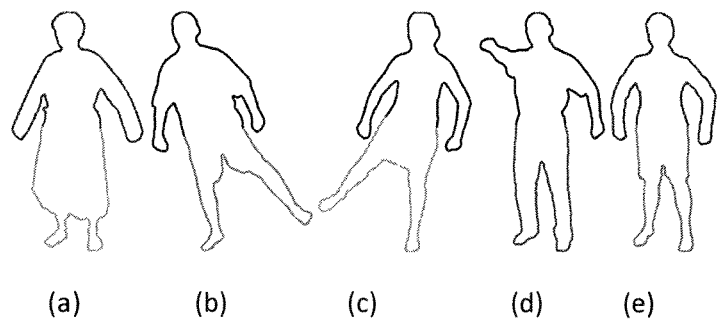
FIG. 9 shows clothing types for three types of upper clothing: long sleeves (a and e; top), short sleeves (b and d; top) and sleeveless tops (c; top) and four types of lower clothing: short pants (b and e; bottom), long pants (d; bottom), short skirt (c; bottom), and long skirts (a; bottom)

Turning now to FIG. 9, different types of clothing can be classified from the estimated clothing deformation coefficients. Upper clothing and lower clothing are separated; in this example, 7 types of clothing are shown: three types of upper clothing: long sleeves (a and e; top), short sleeves (b and d; top) and sleeveless tops (c; top) and four types of lower clothing: short pants (b and e; bottom), long pants (d; bottom), short skirt (c; bottom), and long skirts (a; bottom).

Figure 8:
FIG. 8 shows sample DCP results of estimated underlying bodies overlaid on clothing. Results are shown for a variety of poses (left to right) and viewing directions (top to bottom)
Figure 10:
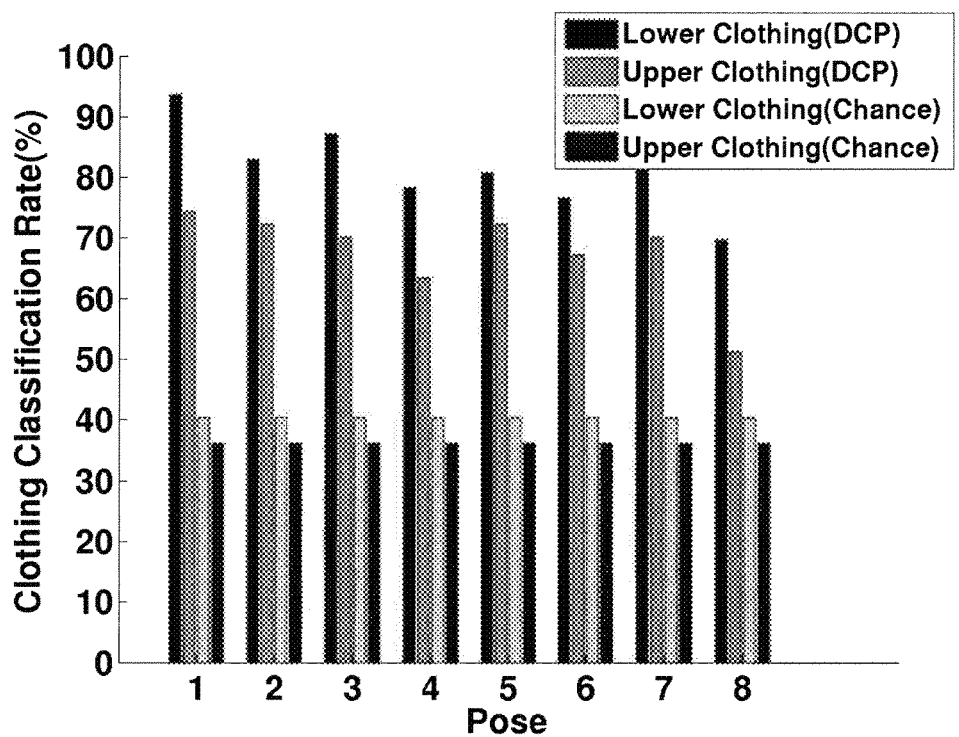
FIG. 10 shows classification results for the DCP model for the 7 clothing types of FIG. 9 and all 8 poses of FIG. 8, as compared to "Chance"

FIG. 10 shows the classification results for the DCP model for the 7 aforementioned clothing types and the 8 different poses shown in FIG. 8, as compared to "Chance". We use a simple nearest neighbor (NN) classifier with Euclidean distances computed from the first 8 principal components. Other classifiers, such as Support Vector Machines, Bayesian classifiers, etc, may also be used. Since the number of clothing instances (47) for each pose is limited, a leave-one-out strategy can be used by assuming that the categories of all the instances, except for the one being tested, are known. Each instance is then assigned a category for both upper clothing and lower clothing based on its nearest neighbor.

obscured by clothing. In the following section we show how to go directly from 2D body shape to 3D measurements.

In computer vision, 3D human detailed shape estimation from 2D marker-less image data is a problem of great interest with many possible applications. The present invention extends the conventional 3D human shape estimation from 2D image data by parameterizing the 2D body through representation of pose deformations using a low dimensional linear model, supporting limb scaling and rotations. In addition, the CP model is extended to views other than frontal. This in turn has the desired side effect of not only making the CP model suitable for additional single-view settings, but also renders the model capable of modeling the human body in a multi-view setup or in a sequential data (such as the estimation of TV character from a full episode).

In addition, the body shape, pose and camera deformation parameters can be optimized, in particular, based various gradient-based optimization methods, for example, Levenberg-Marquardt or Newton's methods.

Lastly, a framework is described to predict 3D body shape from silhouettes in one or several 2D uncalibrated images.

The framework is based on the invariance property of the hidden shape parameter across different views or poses, and relies on the CP factorization. By factoring shape deformation from pose and camera view, we show how to directly predict 3D shape parameters from 2D shape parameters using a discriminative method. In addition to predicting 3D shape from one or more images, the framework allows additional information (such as given height or stature) to be optionally used in predicting 3D body shape.

The 2D shape model parameters described above in relation to the CP model are used directly to estimate 3D shape. This approach has an important advantage. It allows multiple images of a person taken at different times and in different poses to be combined to estimate a consistent 3D shape. Body shape from pose and camera view are taken in consideration for each 2D view of a person. Each 2D view then provides information about 3D shape that should be consistent. The 2D views are then combined into a single 3D shape prediction.

This approach allows body shape to be recovered from a sequence of images (e.g. a video sequence) in which a person is moving. In another application, a person might snap several pictures of a subject with a digital or cell-phone camera. Between each picture, the subject may move or change pose. By factoring 2D body shape from pose and camera changes, the 3D shape can still be estimated accurately.

Figure 11:
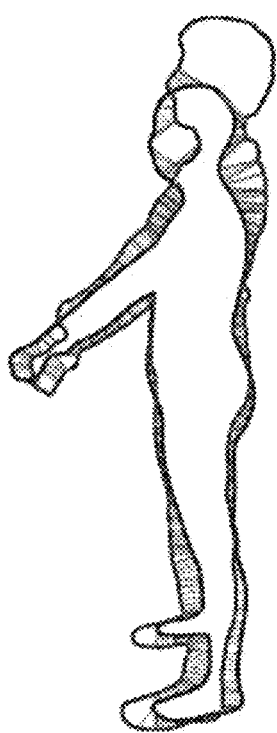
FIG. 11 shows results from an ICP (Iterative Closest Points) model with points mapped to their respecting closest observed points (heavy lines)

The first step in estimating the 3D shape from the 2D shape model parameters is to describe how to fit the CP model to body silhouettes. Given an outline of a silhouette, we would like to find the best fit of the CP model. We employ a bi-directional Iterative Closest Point (ICP) approach. Given a current value of the model parameter $\beta$, for each point of the outline of the model we find the closest point among the observed points (we also impose a threshold on the difference between the normals). This is illustrated in FIG. 11. Likewise, for every observed point we find the closest point among the points of the outline of the model. The method then computes a cost function using an iterative process.

If additional information is available, such as height, weight or other measurements, it is possible to condition the shape model accordingly. This is done by appending the (properly scaled) measurement (or measurements) for the training instances to the vector deformations when learning the PCA model. Then, given a nominal value of height, a conditional PCA shape model can be used. Our experiments show that this type of information, while optional, can improve both fitting and prediction results.

Alternatively, a separate function mapping measurements to 2D shape coefficients can be learned. This could be linear, multi-linear, non-linear or probabilistic. Then given some input measurements, this provides a prediction of 3D shape that can be incorporated as a regularizing prior in the objective function. In this way the known measurements are incorporated during optimization.

Another inherent advantage of the CP model is the fact that every contour point is affiliated with a specific contour part (e.g., the outer side of the left calf, the right side of the torso, etc.). This enables us to reduce the weight of particular body parts during model fitting. For example, by reducing the weight of points that correspond to the head, we increase robustness to errors that are caused by presence of hair. In a similar approach, downweighting the weight in the presence of occlusions enables us to fit the model to data from a cluttered video sequence (e.g., a TV episode during which parts of the body keep appearing and disappearing). In such a case, only some parts of the body may be seen at a given instant. We are thus able to combine many partial views taken at different times, in different poses, and from different camera views into a coherent estimate of 3D shape.

Figure 12:
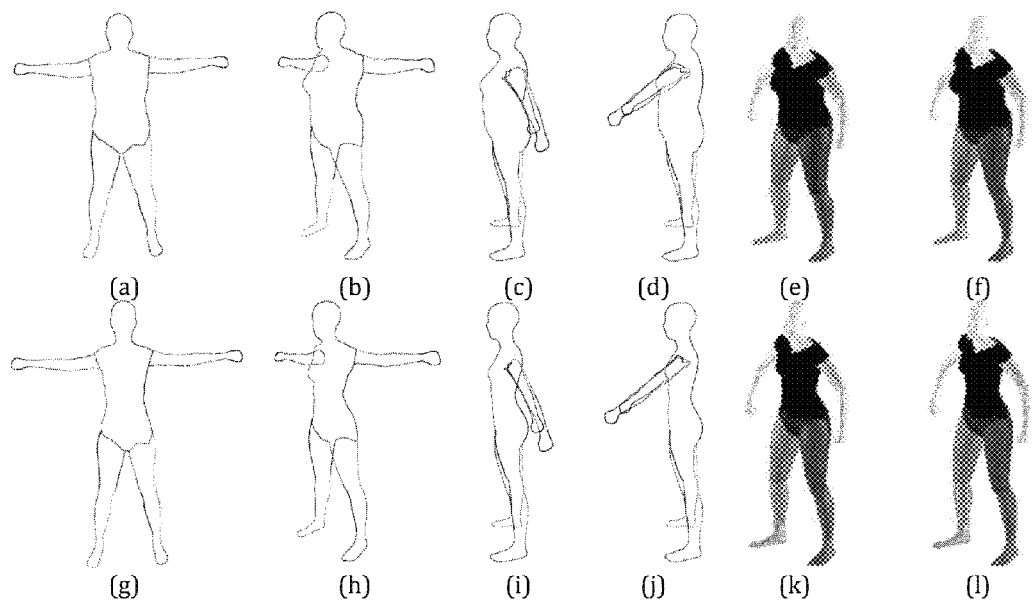
FIG. 12 shows a 3D Shape Prediction aspect of the invention from 2D Contour People. (a-d) and (g-j) show respective CP representations of a particular person in several views and poses. (e) and (k) are the corresponding predicted 3D shapes, while (f) and (i) are the true 3D shapes.

Turning now to FIG. 12, this section will explain how to use the generative 2D CP model to discriminatively predict a 3D human shape. To illustrate the approach we use 4 different views: T-pose in a frontal view (a, g); T-pose in a ¾ view (b, h); a side view with arms behind the body (c, i); and a side view with arms in front of the body (d, j). While other poses and views may also be possible, these poses were found to be both informative enough for purposes of shape prediction, as well as simple for subjects to understand.

We evaluate our 3D prediction framework on 4000 synthetic examples generated from SCAPE. Visual results showing the corresponding predicted 3D shapes are shown in FIG. 12, with (f) and (l) showing the true 3D shapes. Numerical results for different biometric measurements are listed in Table 2, demonstrating the high accuracy of the results.

TABLE 2

Error summary

| Measurement | Average Relative Error | RMS |
|---|---|---|
| Stature (training) | 0.64% | 18.5 [mm] |
| Stature (test) | 0.54% | 11.5 [mm] |
| Knee height (training) | 0.87% | 7.0 [mm] |
| Knee height (test) | 0.82% | 5.3 [mm] |
| Thigh circumference (training) | 1.86% | 17.4 [mm] |
| Thigh circumference (test) | 1.74% | 13.18 [mm] |
| Crotch height (training) | 1.0% | 12.5 [mm] |
| Crotch height (test) | 1.0% | 9.1 [mm] |

Figure 13:
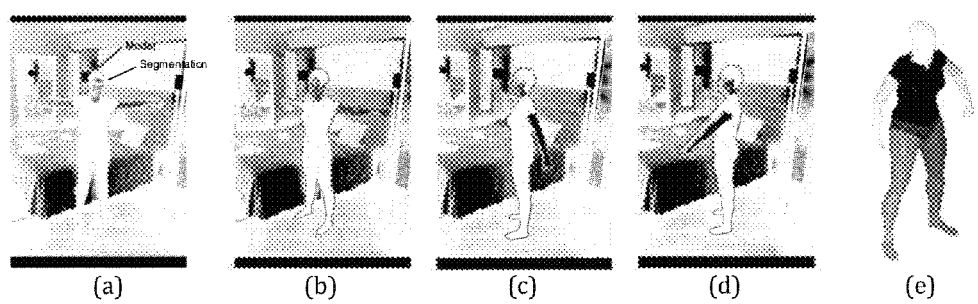
FIG. 13 shows exemplary fits of the 2D CP model for multiple views and a predicted 3D mesh (a)-(e).

A realistic fitting result can be seen in FIG. 13e based on the 2D CP model and the given segmentation. The experiments show that results improved when the square error is replaced with a robust error function as described in the optimization section. This may be important when silhouettes contain outliers due to hair or loose clothing or other errors.

In summary, a novel and complete solution for representing 2D body shape has been described, estimating the 2D body shape from images, and using the 2D body shape to compute 3D body shape. The key property of the 2D contour person model is its ability to factor changes in shape due to identity, pose and camera view. This property allows images of a person taken in different poses and different views to be combined in a 3D estimate of their shape. Moreover we have described how to estimate 2D body shape under clothing using a novel eigen-clothing representation.

There are many application of this invention to person detection, segmentation and tracking; 3D shape estimation for clothing applications, fitness, entertainment and medicine; clothing detection and recognition; shape analysis in video sequences; surveillance and biometrics; etc.

While the invention has been illustrated and described in connection with currently preferred embodiments shown and described in detail, it is not intended to be limited to the details shown since various modifications and structural changes may be made without departing in any way from the spirit and scope of the present invention. For example, as would be known to one of skill in the art, the computations disclosed herein can be performed by an embodiment of this disclosure including a computer system having a processor and a non-transitory computer-readable storage device storing instructions for controlling the processor to perform the operations disclosed herein. Another embodiment, as would be known to one of skill in the art, can include a non-transitory computer-readable storage medium storing instructions for controlling a processor to perform the operations disclosed herein. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed as new and desired to be protected by Letters Patent is set forth in the appended claims and includes equivalents of the elements recited therein:

1. A method, comprising:
generating a three-dimensional model of an unclothed human body, the model capturing a shape or a pose of the unclothed human body;
determining two-dimensional contours associated with the three-dimensional model to yield a two-dimensional model;
computing deformations by aligning a contour of a clothed human body with a contour of the unclothed human body;
based on the two-dimensional contours from the two-dimensional model and the deformations, generating a first two-dimensional model of the unclothed human body, the first two-dimensional model factoring the deformations of the unclothed human body into one or more of a shape variation component, a viewpoint change, and a pose variation; and
learning an eigen-clothing model using principal component analysis applied to the deformations, wherein the eigen-clothing model classifies different types of clothing, to yield a second two-dimensional model of a clothed human body.

2. The method of claim 1, wherein the first two-dimensional model visualizes frontal views and non-frontal views of the unclothed human body.

3. The method of claim 1, wherein the pose variation comprises at least one of a body parts rotation and foreshortening.

4. The method of claim 1, wherein the deformations of the unclothed human body comprise non-rigid deformations resulting from articulation.

5. The method of claim 1, wherein the first two-dimensional model is factored into a linear approximation to distortions caused by local camera view changes.

6. The method of claim 1, wherein the first two-dimensional model is factored into an articulation of body parts represented by a rotation and length scaling.

7. The method of claim 1, wherein the first two-dimensional model is factored into a linear model characterizing shape changes across a population.

8. The method of claim 1, wherein the second two-dimensional model is further generated by defining a set of linear coefficients that produce, from the unclothed human body, a particular deformation associated with a clothing type.

9. A non-transitory computer-readable storage device having stored therein instructions which, when executed by a processor, cause the processor to perform operations comprising:
generating a model of an unclothed human body, the model capturing a shape or a pose of the unclothed human body, wherein the model is a three-dimensional model;
determining two-dimensional contours associated with the model;
computing deformations by aligning a contour of a clothed human body with a contour of the unclothed human body;
based on the two-dimensional contours and the deformations, generating a first two-dimensional model of the unclothed human body, the first two-dimensional model factoring the deformations of the unclothed human body into one or more of a shape variation component, a viewpoint change, and a pose variation; and
learning an eigen-clothing model using principal component analysis applied to the deformations, wherein the eigen-clothing model classifies different types of clothing, to yield a second two-dimensional model of a clothed human body.

10. The non-transitory computer-readable storage device of claim 9, wherein the first two-dimensional model visualizes frontal views and non-frontal views of the unclothed human body.

11. The non-transitory computer-readable storage device of claim 9, wherein the pose variation comprises at least one of a body parts rotation and foreshortening.

12. The non-transitory computer-readable storage device of claim 9, wherein the deformations of the unclothed human body comprise non-rigid deformations resulting from articulation.

13. The non-transitory computer-readable storage device of claim 9, wherein the first two-dimensional model is factored into a linear approximation to distortions caused by local camera view changes.

14. The non-transitory computer-readable storage device of claim 9, wherein the first two-dimensional model is factored into an articulation of body parts represented by a rotation and length scaling.

15. The non-transitory computer-readable storage device of claim 9, wherein the first two-dimensional model is factored into a linear model characterizing shape changes across a population.

16. The non-transitory computer-readable storage device of claim 9, wherein the second two-dimensional model is further generated by defining a set of linear coefficients that produce, from the unclothed human body, a particular deformation associated with a clothing type.

17. A system comprising:
a processor; and
a non-transitory computer-readable storage medium having stored therein instructions which, when executed by the processor, cause the processor to perform operations comprising:
generating a model of an unclothed human body, the model capturing a shape or a pose of the unclothed human body, wherein the model is a three-dimensional model;
determining two-dimensional contours associated with the model;
computing deformations by aligning a contour of a clothed human body with a contour of the unclothed human body;
based on the two-dimensional contours and the deformations, generating a first two-dimensional model of the unclothed human body, the first two-dimensional model factoring the deformations of the unclothed human body into one or more of a shape variation component, a viewpoint change, and a pose variation; and learning an eigen-clothing model using principal component analysis applied to the deformations, wherein the eigen-clothing model classifies different types of clothing, to yield a second two-dimensional model of a clothed human body.

\* \* \* \* \*